United States Patent [19]  [11] 4,420,935
Kobald  [45] Dec. 20, 1983

[54] HYDRAULIC SYSTEM
[75] Inventor: Walter Kobald, Schwieberdingen, Fed. Rep. of Germany
[73] Assignee: Robert Bosch GmbH, Stuttgart, Fed. Rep. of Germany
[21] Appl. No.: 123,791
[22] Filed: Feb. 22, 1980
[30] Foreign Application Priority Data
Mar. 17, 1979 [DE] Fed. Rep. of Germany ....... 2910611
[51] Int. Cl.³ .......................................... F15B 13/08
[52] U.S. Cl. ..................................... 60/427; 60/452
[58] Field of Search ................. 60/420, 452, 427, 450; 137/596.13

[56] References Cited
U.S. PATENT DOCUMENTS

| Re. 29,538 | 2/1978 | Budzich | 137/596.2 |
|---|---|---|---|
| 3,444,689 | 5/1969 | Budzich | 60/427 |
| 3,470,694 | 10/1969 | Budzich | 60/427 |
| 3,623,321 | 11/1971 | Schwerin | 60/452 X |
| 3,858,393 | 1/1975 | Budzich | 60/427 |
| 3,987,626 | 10/1976 | Bianchetta | 60/452 X |
| 4,011,721 | 3/1977 | Yip | 60/445 |
| 4,030,522 | 6/1977 | Heiser | 137/596.13 |
| 4,037,621 | 7/1977 | Budzich | 137/596.13 |
| 4,112,679 | 9/1978 | Budzich | 60/452 X |
| 4,153,075 | 5/1979 | Budzich | 137/596.13 |
| 4,194,363 | 3/1980 | Young | 60/452 X |
| 4,199,942 | 4/1980 | Kasper | 60/445 X |

Primary Examiner—Gerald A. Michalsky
Attorney, Agent, or Firm—Michael J. Striker

[57] ABSTRACT

The hydraulic system has an adjustable pump for delivering pressure fluid to a plurality of loads, multiway control valve assigned to respective loads and means for adjusting the flow of the pressure fluid to the working conditions of the loads, the adjusting device includes measuring throttles provided in the switching passages of respective control valves and a flow regulating device having a differential piston displaceable by the pressure difference at the outlet of the pump and at the outlet of the measuring throttle of the activated control valve. Th differential piston controls a branched stream of high pressure fluid from the pump to control an actuator in the form of a cylinder and piston unit mechanically coupled to the adjusting member for the pump.

2 Claims, 4 Drawing Figures

HYDRAULIC SYSTEM

BACKGROUND OF THE INVENTION

The present invention relates in general to a hydraulic system, and in particular to a system having an adjustable pump, a plurality of loads, a plurality of multiway control valves each having a plurality of flow directing passages, and pressure conduits for connecting the outlet of the pump via the control valves to the load. Conventional hydraulic systems of this type have the disadvantage that they respond too fast and consequently the loads are susceptible to jerking movements because the sudden change of the position of respective multiway control valves causes an excessive pressure increase.

SUMMARY OF THE INVENTION

It is, therefore, a general object of the present invention to overcome the aforementioned disadvantage.

More particularly, it is an object of the invention to provide an improved hydraulic system of the aforedescribed type where the load upon actuation of the corresponding control valve is switched on softly so that no pressure shocks take place.

Another object of this invention is to provide such an improved hydraulic system in which the adjustable pump can be driven at a lower power than in conventional systems of this type because the invention reduces the pressure of the pump when the largest delivery of the pressure fluid is required.

In keeping with these objects and others which will become apparent hereafter, one feature of the invention resides, in a hydraulic system of the above-described type, in the provision of means for adjusting the flow of the pressure fluid to the working conditions of the loads, the adjusting means including measuring throttles provided respectively in the passages of the control valves which are assigned to the high pressure conduits, a spring biased flow regulating valve connected for regulating at its outlet a pressure fluid flow which is proportional to the pressure difference across the measuring throttle in an actuated control valve, a hydraulic actuating member connected to the outlet of the regulating valve and being mechanically coupled to the adjustable pump for adjusting its output.

In the preferred embodiment of this invention, the return conduits from respective loads are connected to a common return conduit which at its downstream portion is provided with a throttle.

The flow regulating valve has preferably a sliding spool acting as a differential piston provided with a larger end face attacked by the delivery pressure from the outlet of the pump and a smaller other end face attacked by the pressure fluid at the load whereby the biasing spring acts also on the smaller end face. The hydraulic actuating member is preferably in the form of a cylinder-and-piston unit the cylinder of which communicates via the outlet of the flow regulating valve with a high pressure conduit from the pump and the piston of which is spring biased in the direction in which the pump is adjusted for an increased delivery of the pressure fluid. A pressure limiting valve is connected parallel to the flow regulating valve to provide for a preliminary adjustment of the latter.

The flow regulating valve can be modified also in such a manner that its sliding spool has equal end faces whereby the pressure fluid from the outlet of the pump is admitted in the cylinder of the unit via a control valve the control member of which is biased in opposite direction by a set of springs having different bias so that the pump is normally adjusted toward the decrease of its delivery. The control member of the control valve is coaxial with the piston of the cylinder and piston unit controls also the connection of the latter to a tank.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
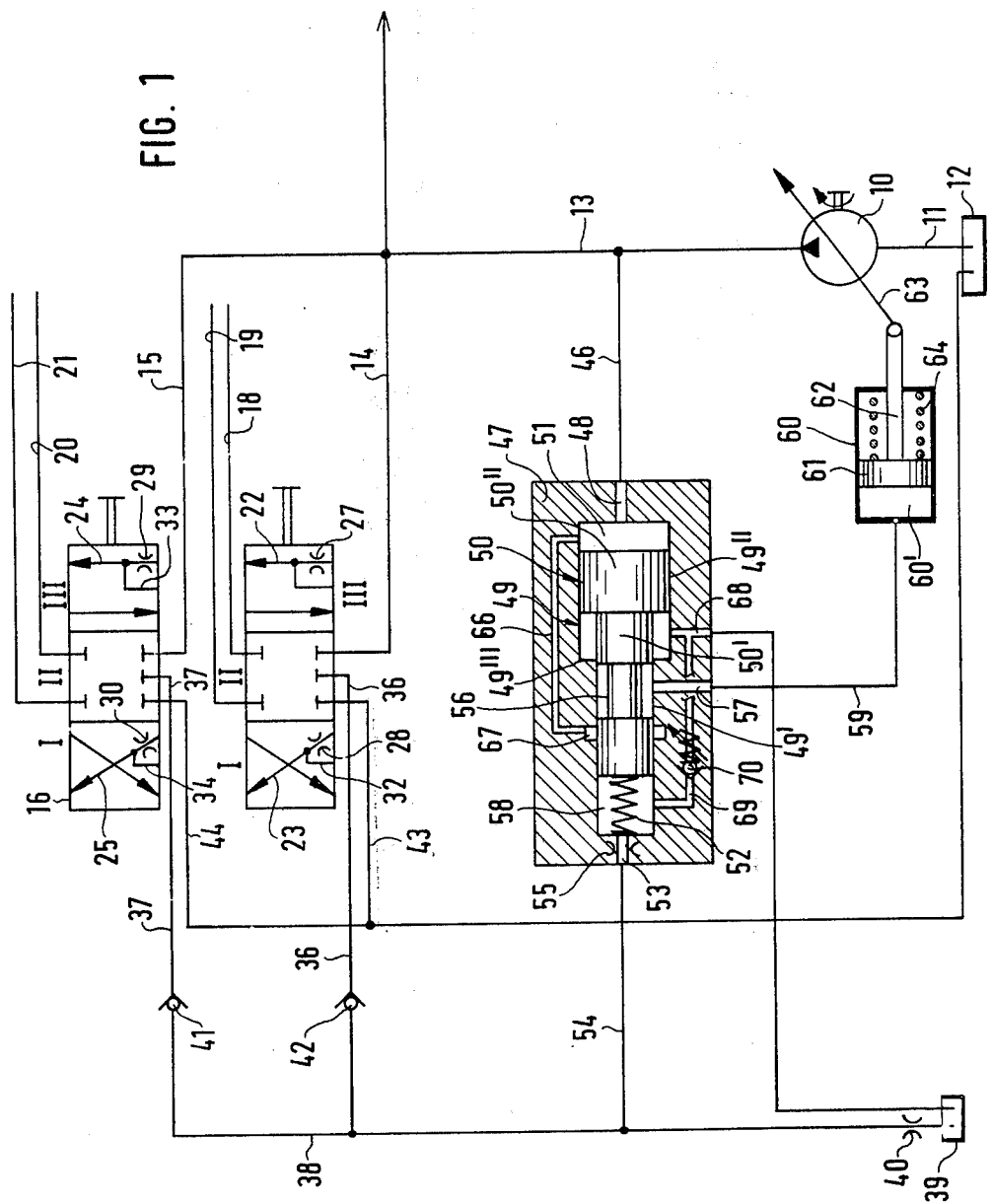
FIG. 1 is a schematic circuit diagram of an embodiment of the hydraulic system of this invention.
Figure 3:
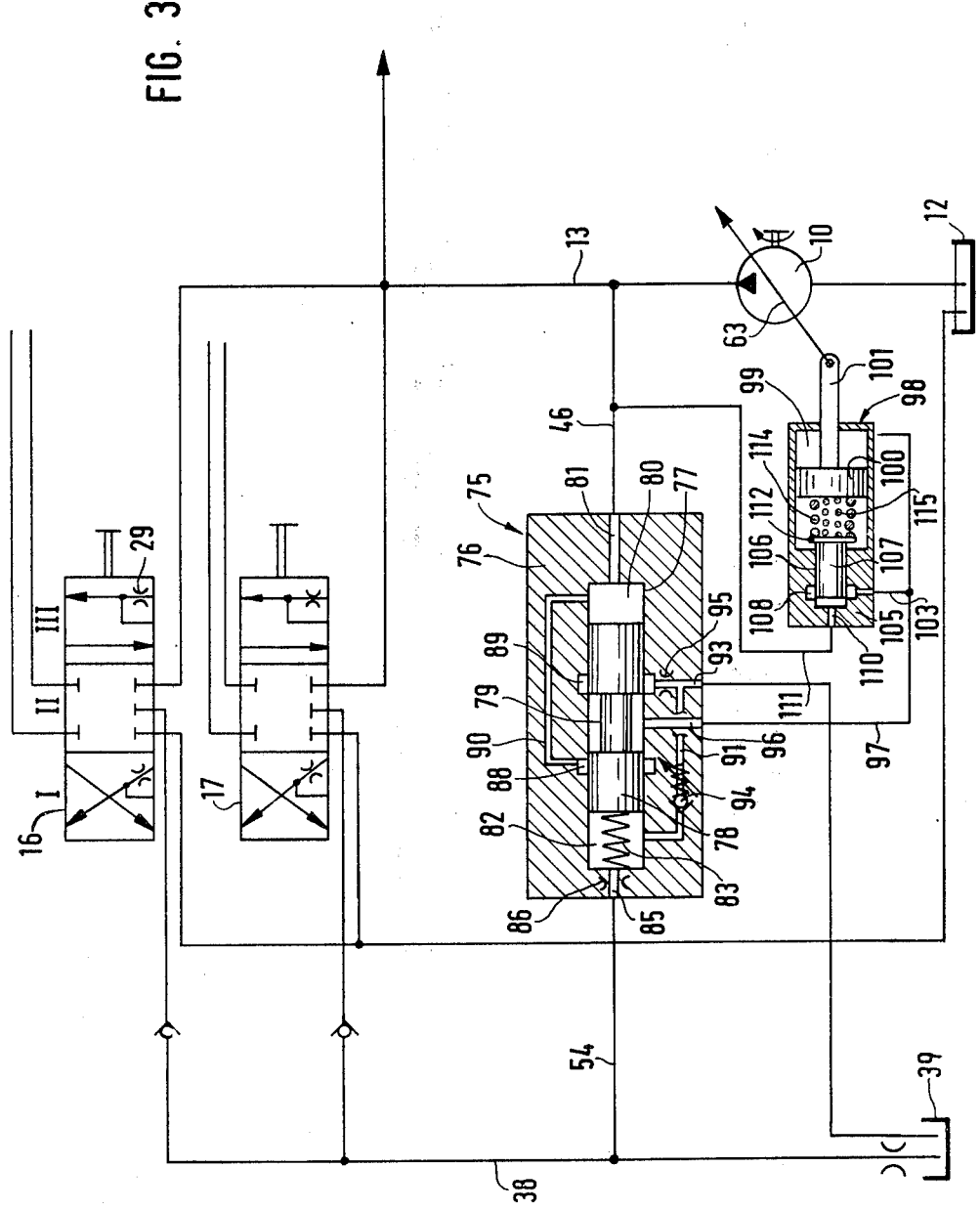
FIG. 3 is a schematic circuit diagram of another embodiment of the hydraulic system of this invention.

In both examples of the hydraulic system of this invention as illustrated in FIGS. 1 and 3, the reference numeral 10 designates an adjustable pump which sucks in via a suction conduit 11 a working fluid from tank 12. The outlet of the pump 10 is connected to a high pressure conduit 13 having branch conduits 14 and 15 connected respectively to high pressure ports of multiway control valves 16 and 17. The outlet high pressure ports of respective multiway control valves 16 and 17 are connected to nonillustrated loads via conduits 18 and 20 whereas the return conduits 19 and 21 from the loads are connected via corresponding passages in the control valves to return conduits 43 and 44 communicating with the tank 12. There can be of course connected in the same fashion more than two loads via the corresponding multiway control valves and branch conduits of the high pressure conduit 13 or only one load with a single control valve. In this example, the multiway control valves 16 and 17 are five-way three-position control valves. Depending on the actuated valve position, the return conduits 19 and 21 in position III become high pressure conduits in the valve position I and the function of the high pressure conduits 18 and 20 in position III is reversed accordingly. The high pressure passages or channels 22 and 23 in control valve 17 and channels 24 and 25 in control valve 16 are provided respectively with measuring throttles 27, 28, 29 and 30 whereby downstream of each measuring throttle there is connected a branch channel 31, 32, 33 and 34 connectable via an additional port in each valve to conduits 36 and 37 leading via nonreturn valves 41 and 42 to a collecting conduit 38 opening into an auxiliary tank 39 and the downstream portion of which is provided with a throttle 40. The nonreturn valves 41 and 42 permit the flow in the direction toward the auxiliary tank 39 but close the flow in the opposite direction. As it will be explained below, a branch conduit 54 between the throttle 40 and the inlets of the conduits 36 and 37 into the collecting conduit 38 delivers a first regulating stream of pressure fluids to one end of a flow regulating valve 47.

At the opposite end of the flow regulating valve, there is provided a branch conduit 46 opening into the pressure conduit 13 at the outlet of the pump 10. The flow regulating valve 47 includes a housing provided with a stepped central bore 39 defining a bore portion 49' of a smaller diameter and a bore portion 49" of a larger diameter for accommodating a stepped differential piston 50 having a part 50' of a smaller diameter and a part 50" of a larger diameter movable in the corresponding parts of the central bore. The end face of the smaller part 50' of the piston communicates via a pressure chamber 58 and an inlet port 53 with the aforementioned conduit 54 which supplies pressure at the downstream end of each measuring throttle 27 through 30 into the chamber 58. The piston part 50" of a larger diameter communicates via another pressure chamber 51 and an inlet port 48 with the aforementioned branch conduit 46 which admits into the pressure chamber 51 pressure at the upstream portion of respective measuring throttles 27 through 30. An adjustment spring 52 is arranged in the pressure chamber 58 to act against the face of the smaller piston part 50' and an attenuation throttle 55 is arranged in the inlet port 53 leading to the conduit 54. The piston part 50' of smaller diameter is formed with an annular groove 56 defining with the central bore 49' an annular space communicating via an outlet port 57 with a conduit 59 which is connected to a cylinder 60' of a hydraulic actuator or cylinder-and-piston cylinder unit 60 the piston 61 of which is mechanically coupled to a piston rod 62 to an adjustment member 63 of the pump 10. The piston 61 is biased by a helical spring 64 in the direction acting against the pressure in the cylinder 60' and in this direction the control member 63 adjusts the pump 10 to feed a larger amount of pressure fluid. A channel 66 connects the pressure chamber 51 with a recessed annular groove 67 in the housing of the flow regulating valve 47, the latter groove cooperating with the control edge of the annular groove 56 on the piston part 50' and thus controls the pressure fluid flow from the conduit 46 into the cylindrical space 60' of the actuator 60. In addition, a channel 68 connects an annular space 49" formed between the smaller piston part 50' and the larger stepped bore 49" with the auxiliary tank 39. A branched channel 69 connects the pressure chamber 58 via a pressure limiting valve 70 to the channel 68 so that pressure fluid from the chamber 58 can be discharged into the tank 39 and pressure fluid from the space 49" is prevented from entering the pressure space 58.

When the control valves 16 and 17 are set in their neutral position II in which the high pressure fluid in conduit 13 is disconnected from the load and the balancing return conduits 36 and 37 are without any pressure fluid, the pressure in the right-hand pressure chamber 51 of the flow regulating valve 47 exceeds the pressure exerted by the adjustment spring 52 and the differential piston 50 moves to the left. As a result, the pressure fluid from the right hand pressure chamber 51 flows via the channel 66, the annular groove 67 and the outlet port 57 into the conduit 59 and therefrom into the pressure space 60' of the cylinder and piston servo unit 60. The pressure admitted into the space 60' moves the piston 61 to the right against the force of spring 64 thus adjusting the pump 10 to a lower amount of the delivered pressure fluid.

Provided that the control valve 16 for example, is shifted to its actuated position III, the pressure fluid from the high pressure conduit 13 flows via branch conduit 15, the measuring throttle 29, the passage 24 and the pressure conduit 20 into the load. As a result, the small pressure difference, for example of 6 bars takes place across the measuring throttle 29 and the flow of pressure fluid at this lower pressure is fed through the bypass channel 33, the conduit 37, the collecting conduit 38 and the conduit 64 into the left-hand pressure chamber 58 of the flow regulating valve 47. The throttle 40 at the end of the collecting conduit 38 is adjusted such as to cause a small pressure drop also of 6 bars, for example. According to the load switched on by the control valve 16, an increasing pressure builds up in the left-hand chamber 58 which together with the force of the adjustment spring 52 displaces the differential piston 50 to the right whereby the recessed annular channel 67 is closed by the smaller piston part 50' and a control edge of the smaller piston part 50' passes the step of the bore part 49". As a result, the biasing spring 64 in the cylinder and piston unit 60 urges the piston 61 to the left and discharges pressure fluid from the cylindrical space 60' through conduit 59, port 57, annular space 56, the annular space 49", the port 68 into the tank 39. Due to this movement of piston 61 to the left, the pump controlling member 63 adjusts the pump 10 to deliver more pressure fluid at a higher pressure according to the need of the load. As a consequence of the increasing pressure in the conduit 13, the differential piston 50 keeps moving to the left until a pressure balance in chambers 51 and 58 is established whereby the recessed annular channel 67 remains closed and the communication between the ports 57 and 68 is interrupted.

Figure 2:
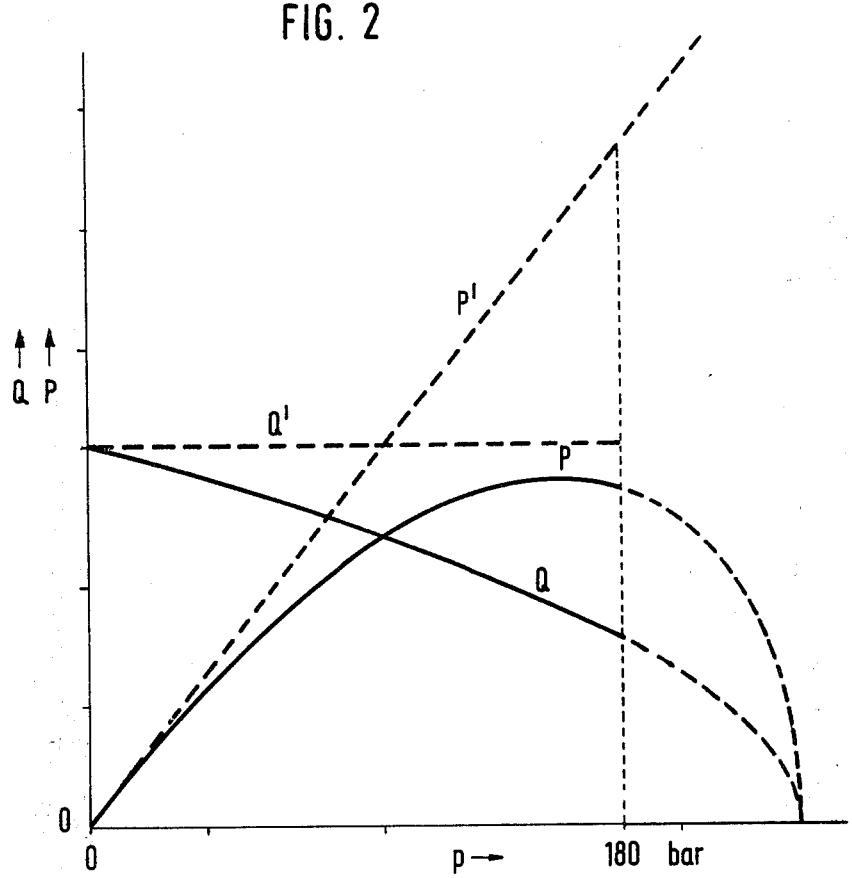
FIG. 2 is a plot diagram showing the relationship between the pressure of the pump and its driving power or the magnitude of its delivery.

The plot diagram in FIG. 2 shows the effect of the flow regulating valve on the operation of the hydraulic system of this invention. The feed pressure p of the pump is plotted on the abscissa in bars whereas on the ordinate is plotted the required driving power P for the pump or the discharge quantity of pressure fluid Q. For the sake of a comparison, there are illustrated by dashed lines characteristics of conventional hydraulic systems, namely the horizontal characteristics Q' for the delivered or discharged pressure fluid stream and the sloping straight line P' for the driving power. The characteristics of the system of this invention are indicated by full lines P and Q which indicate that by decreasing the discharged or delivered amount Q of pressure fluid while increasing the discharge pressure p of the pump the input or required driving power P for the pump increases according to a curve toward a certain limit at which even at increasing discharge pressure it does no longer increase. In other words, the required driving power is smaller than in conventional hydraulic systems and the switching conditions for the load are more favorable and softer.

In the event that the limit pressure adjusted in the passage 69 is exceeded, the pressure limiting valve 70 opens and pressure fluid starts flowing from the chamber 58 to the tank 39 whereby the high pressure in the chamber 58 breaks down. As a consequence, the differential piston 50 starts rapidly moving to the left and the high pressure fluid from the recessed annular channel 67 attacks via the port 57 and conduit 59 the piston 61 of the actuator 60 and displaces the piston against the force of the biasing spring 64, thus adjusting the pump 10 to the zero discharge of the pressure fluid.

In the modification of the hydraulic system of this invention as illustrated in FIG. 3, like component parts are designated by like reference numerals. The modification differs from the embodiment of FIG. 1 in the flow regulating valve and in the shape of the cylinder-and-piston servo unit 98 for the pump 10. The flow regulating valve 75 has a housing 76 defining a bore 77 which has a uniform diameter and tightly guides the sliding piston or spool 78 provided in the central part of its upper surface with an annular groove 79. The end faces of the piston 78 form with the end walls of the bore 77 first pressure chamber 82 and a second pressure chamber 80. The chamber 80 communicates via a port 81 with a branch 46 of the pressure fluid conduit 13. The opposite chamber 82 includes again an adjustment pressure spring 83 for biasing the piston 78 and communicates via a port 85 with a branch conduit 54 of the regulating conduit 38. The port 85 is provided with a throttle 86 similarly as in the preceding example.

The central bore 77 of the regulator 75 is provided with two recessed annular channels 88 and 89. The left-hand annular channel 88 is connected via a passage 90 to the right-hand pressure chamber 80 whereas the right-hand recessed channel 89 communicates with a return port 93 and via a passage 91 with the left-hand pressure chamber 82. The return port 93 is connected via return conduit to the tank 39. Similarly as in the preceding example, the channel 91 in the housing 76 is provided with a pressure limiting valve 94 serving for the same purpose. The return port 93 is provided with an additional throttle 95 arranged between the connection of the passage 91 and the recessed annular channel 89.

A control port 96 communicates with a central part of the bore 77 and is connected via a conduit 97 to a second flow regulator which acts simultaneously as the cylinder and piston unit for adjusting the discharge of the pump 10. The regulator 98 includes a pressure space 99 communicating via the conduit 97 with the central annular space in the bore 77 defined by the annular groove in the piston of the first flow regulating valve 75. The pressure space 99 is bound by the piston 100 which is coupled by a piston rod 101 to the adjustment member 63 of the pump 10. The conduit 97 from the flow regulating valve 75 is branched through a conduit 103 which opens via an annular channel 108 into an axial bore 106 formed in the housing 105 of the second regulator 98. The axial bore 106 slidably guides piston 107 which controls the closing and the opening of the annular channel 108. The end of the axial bore 106 is connected via a port 110 and a conduit 111 with the high pressure branch conduit 46. The end of the piston 107 facing the working piston 100 is provided with a flange 112 which supports two pressure springs 114 and 115 each having a different bias and resting on the juxtaposed end face of the working piston 100. In this manner, the two springs 114 and 115 urge the two pistons 107 and 100 one from the other.

When the multiway control valves 16 and 17 are brought into their neutral positions II as illustrated in FIG. 3, a high pressure builds up in the pressure conduit 13 because the pump discharges momentarily the pressure fluid against the closed multiway control valves. At the same time, the pressure in return conduits 44 and 38 drops to zero. As a consequence, the control piston 78 in the first flow regulating valve 75 is displaced to the left against the force of the adjustment spring 83 and the high pressure fluid from the conduit 46 starts to flow through port 81, passage 90, annular channel 88, port 96 and conduit 97 into the pressure space 99 of the second regulator 98 and displaces the working piston 100 to the left against the biasing force of springs 114 and 115 and the pump 10 becomes adjusted in the direction of the zero discharge of the pressure fluid. Upon exceeding a preset discharge pressure of the pump 10 the high pressure in the conduit 111 causes the displacement of the sliding piston 107 to the right against the force of the springs 114 and 115 whereupon the pressure fluid from the conduit 111 and from the annular channel 108 starts flowing via the branch conduit 103 and the conduit 97 into the pressure chamber 99 of the second regulator whereupon the piston 100 adjusts the pump again in the direction of the zero discharge of the pressure fluid.

When, by actuating one of the multiway control valves 16 and 17, a load is activated, a pressure builds up in the regulating return conduit 38 similarly as in the example according to FIG. 1, and the control piston 78 of the first flow regulating valve 75 is displaced to the right, that is in the direction of the bias of the adjustment spring 83 and the annular space defined by the annular groove 79 is brought via the return port 93 into communication with the tank 39 and the pressure fluid in the working pressure space 99 of the second regulator is discharged via the conduit 97 and the discharge port 93 into the tank 39. The springs 114 and 115 can now displace the working piston 100 to the right so that the pump 10 starts delivering pressure fluid and a high pressure builds up in conduits 13, 46 and in the right hand pressure chamber 80 and acts upon the corresponding end of the control piston 78 and moves the latter against the force of the adjustment spring 83 to the left into its neutral position in which the recessed annular channels 88 and 89 are closed and no pressure fluid is permitted to discharge from the pressure space 99 of the regulating cylinder and piston unit 98. As a consequence, the pump remains adjusted in this delivering position.

Figure 4:
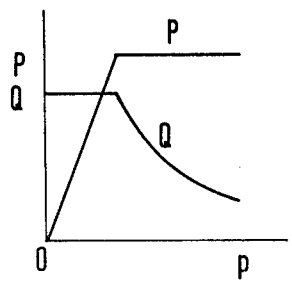
FIG. 4 is a plot diagram referring to the embodiment of FIG. 3.

If the resistance in the load increases and a corresponding increased pressure builds up which exceeds the feeding pressure in the conduit 13 adjusted by the second regulator 98, so this increased pressure is transmitted via conduit 111 and the port 110 against the regulating piston 107 and displaces the same to the right against the bias of springs 114 and 115 defined by the position of the working piston 100. Due to this displacement, port 110 is connected via the recessed annular channel 108 to the branch conduit 103 and the pressure fluid flows via conduits 46, 111 and 103 again into the working pressure space 99 in the regulating cylinder and piston unit, displaces the working piston 100 to the left whereby the pump is adjusted in the direction of smaller discharged amounts. In this manner at a constant maximum driving power P of the pump the amount Q of the delivered pressure fluid decreases approximately parabolically as illustrated in the plot diagram in FIG. 4. In this diagram, the abscissa again indicates the discharge pressure p of the pump and the ordinate indicates the input power P or the amount Q of the discharged fluid. It can be seen again that at a constant driving power and at an increasing feeding pressure the quantity or amount Q of the discharge fluid decreases.

When the feeding pressure p exceeds a preset point, the pressure limiting valve 94 responds whereupon the control piston 78 is displaced to the left against the force of the adjustment spring 83 because while the pressure in the chamber 82 remains constant it increases in the other chamber 80. The recessed annular channel 88 is now connected via the port 96 and the conduit 97 to the working pressure space 99 of the second regulator and the working piston 100 while moving to the left adjusts the pump 10 in the direction of zero amount of the discharged fluid (pressure cutoff by means of the pressure limiting valve 94).

The purpose of the throttle 95 in the port 93 of the flow regulating valve 75 is to prevent the pressure drop in the conduit 97 and in the pressure space adjoining the working piston 100, which may occur when the second regulator 98 has to override the first flow regulating valve 75.

By means of the hydraulic system according to the embodiment of FIG. 3 a power controlled operation and a power limit of the pump is achieved whereby also a softer switching operation of respective valves in the system takes place.

It will be understood that each of the elements described above, or two or more together, may also find a useful application in other types of constructions differing from the types described above.

While the invention has been illustrated and described as embodied in specific embodiments of the hydraulic system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a hydraulic system having an adjustable pump, a plurality of multiway control valves each having inlet and outlet ports and shiftable control passages, conduits for delivering pressure fluid from said pump via said control valves to a plurality of loads, means for adjusting the flow of the pressure fluid to the working conditions of said loads, the adjusting means including measuring throttles provided respectively in the passages of said multiway control valves which are assigned to high pressure conduits for said loads, an additional passage provided in each of the multiway control valves and being connected to the outlet of the assigned measuring throttle, a regulating flow return conduit connected to respective multiway control valves to communicate with the additional passage when the control valves are switched-over into a working position; an additional throttle provided in the outlet end of the regulating return conduit, flow regulating means controlled by the pressure difference between the outlet of the pump and the pressure in the regulating return conduit, and a hydraulically controlled actuator connected to the outlet of the pump via the flow regulating means and being mechanically coupled to the pump to adjust the discharge of the latter in response to the working conditions of the load, an arrangement of said flow regulating means comprising a flow regulating valve having a housing and, within the housing, a stepped differential piston defining a first part of a larger diameter and a second part of a smaller diameter; a first pressure space adjoining the end face of the first piston part and being connected to the pressure conduit at the outlet of said pump; a second pressure space adjoining the second piston part and being connected to said regulating return conduit; an adjusting spring arranged in said second pressure space to bias said differential piston toward said first pressure space; a first annular groove formed in said second piston part; a control port formed in said housing in the range of said annular groove; a second annular groove formed in said housing between the end face of the second piston part and said first annular groove; a bypass conduit connecting said first pressure space to said second annular groove; and said control port being connected to said actuator.

2. In a system as defined in claim 1, said flow regulating valve further including a passage connecting said second pressure space with a tank, and a pressure limiting valve arranged in said passage for preadjusting the limit pressure for said flow regulating means.

* * * * *